(12) United States Patent
Baron

(10) Patent No.: US 8,885,076 B2
(45) Date of Patent: Nov. 11, 2014

(54) CAMERA SENSOR DEFECT CORRECTION AND NOISE REDUCTION

(75) Inventor: John M. Baron, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2057 days.

(21) Appl. No.: 11/694,052

(22) Filed: Mar. 30, 2007

(65) Prior Publication Data

US 2008/0239113 A1  Oct. 2, 2008

(51) Int. Cl.
*H04N 5/217* (2011.01)
*H04N 9/64* (2006.01)
*H04N 5/367* (2011.01)
*H04N 9/04* (2006.01)

(52) U.S. Cl.
CPC ............ *H04N 9/045* (2013.01); *H04N 5/3675* (2013.01)
USPC .......................................... 348/246; 348/241

(58) Field of Classification Search
USPC ................................................ 348/241–251
See application file for complete search history.

(56) References Cited

U.S. PATENT DOCUMENTS

| | | | |
|---|---|---|---|
| 6,965,395 B1 | 11/2005 | Neter | |
| 6,985,180 B2 | 1/2006 | Chang et al. | |
| 7,015,961 B2 | 3/2006 | Kakarala | |
| 7,173,741 B1 * | 2/2007 | Kindt et al. | 358/443 |
| 7,443,433 B2 * | 10/2008 | Hara | 348/246 |
| 7,471,842 B2 * | 12/2008 | Wu et al. | 382/254 |
| 7,580,589 B2 * | 8/2009 | Bosco et al. | 382/275 |
| 2004/0051798 A1 | 3/2004 | Kakarala et al. | |
| 2005/0069217 A1 * | 3/2005 | Mukherjee | 382/266 |
| 2005/0248671 A1 * | 11/2005 | Schweng | 348/246 |
| 2006/0044425 A1 | 3/2006 | Yeung et al. | |
| 2006/0221214 A1 | 10/2006 | Yanof et al. | |
| 2007/0091187 A1 * | 4/2007 | Lin | 348/246 |
| 2008/0122954 A1 * | 5/2008 | Ting | 348/246 |

* cited by examiner

*Primary Examiner* — Roberto Velez
*Assistant Examiner* — Pritham Prabhakher

(57) ABSTRACT

Systems and methods for camera sensor defect correction and noise reduction are disclosed. In an exemplary implementation, a method may include comparing a pixel in a digital image to neighboring pixels to identify an anomaly. The method may also include ignoring the anomaly if the anomaly occurs in at least one neighboring pixel, and marking the pixel as defective if the anomaly does not occur in any neighboring pixels.

17 Claims, 4 Drawing Sheets

CAMERA SENSOR DEFECT CORRECTION AND NOISE REDUCTION

BACKGROUND

Digital cameras include at least one camera sensor, such as, e.g., a charge coupled device or "CCD" or complementary metal oxide semiconductor (CMOS) sensor. The digital camera includes a plurality of photosensitive cells, each of which builds-up or accumulates an electrical charge in response to exposure to light. The accumulated electrical charge for any given pixel is proportional to the intensity and duration of the light exposure, and is used to generate digital photographs.

Camera sensors have defects, perhaps thousands of defective pixels in a camera sensor having millions of pixels. These defective pixels may be identified during a calibration procedure in which the location of defective pixels is stored in a list on the camera itself. When the camera is used to take pictures, the defective pixels are blurred using pixel data from surrounding "good" pixels.

However, the list of defective pixels uses limited storage space on the camera. In addition, pixels that were determined to be "good" pixels during calibration, may later become defective during camera use. Furthermore, pixels that were determined to be defective pixels during calibration may actually be "good" pixels under different conditions during camera use.

DETAILED DESCRIPTION

Systems and methods are disclosed herein for camera sensor defect correction and noise reduction. In an exemplary embodiment, an "on-the-fly" method may be implemented for identifying defective pixels for each image (or at least selected images) generated during camera use by comparing each pixel to all neighboring pixels. If the pixel is indeed defective, it is corrected using pixel data from surrounding pixels using traditional techniques (e.g., interpolation among neighboring pixel values or "blurring," median filtering, etc.). If the pixel is "good" (e.g., the anomaly is part of the picture and not a pixel defect), the actual pixel data is used for the image.

As used herein the term "defective pixel" and pixels affected by "noise" means any pixel value which is significantly different than what should be recorded to represent the scene being photographed.

Figure 1:
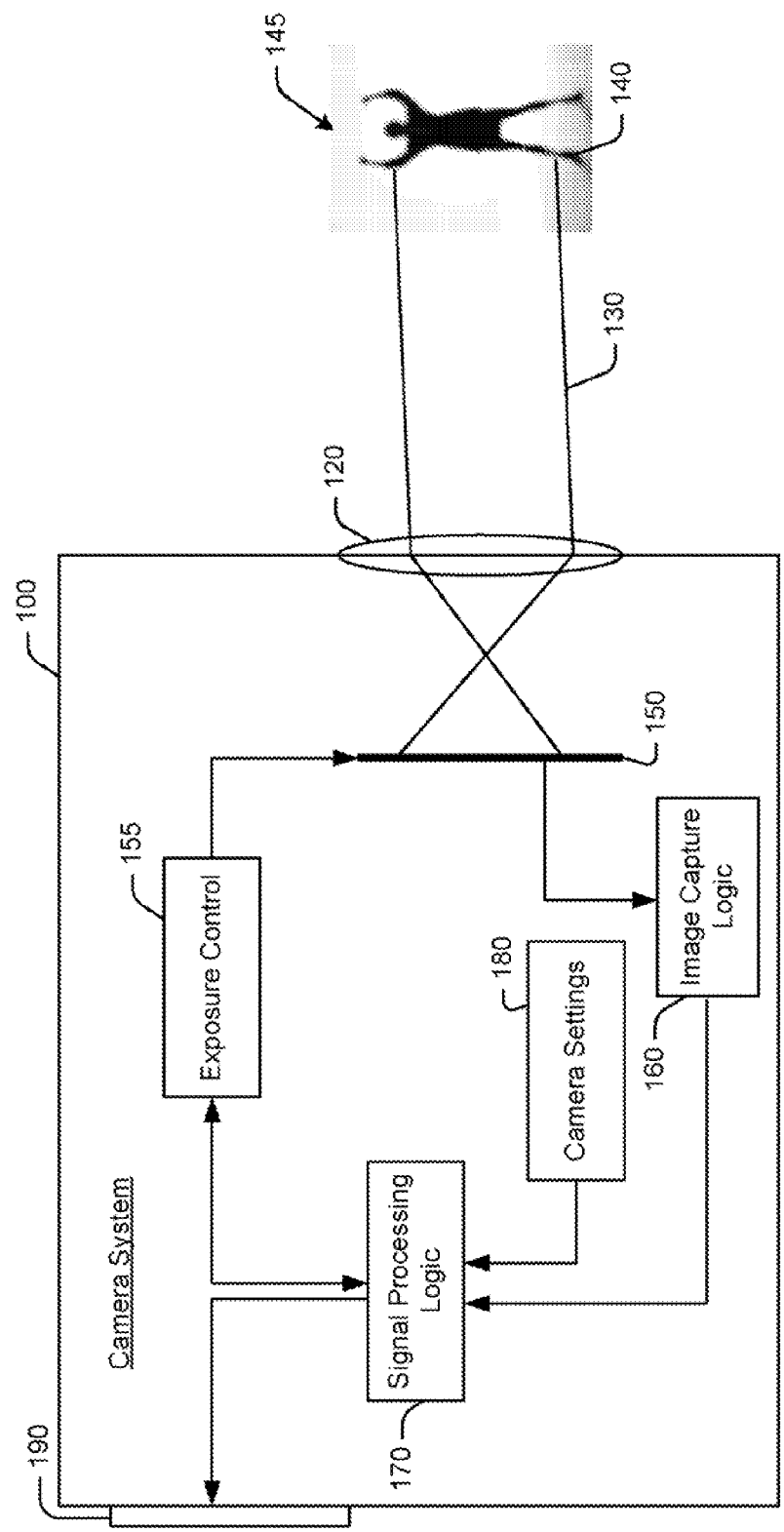
FIG. 1 is a component diagram of an exemplary camera system.

FIG. 1 is a component diagram of an exemplary camera system 100. Although reference is made to a particular digital still-photo camera system 100, it is noted that the systems and methods described herein for identifying camera sensors may be implemented with any of a wide range of digital still-photo and/or video cameras, now known or that may be later developed. In yet other embodiments, sensor defect correction and noise reduction may also be used for the sensors of other imaging devices (e.g., scanners, medical imaging, etc.).

Exemplary camera system 100 may include a lens 120 positioned in the camera system 100 to focus light 130 reflected from one or more objects 140 in a scene 145 onto a camera sensor 150. Exemplary lens 120 may be any suitable lens which focuses light 130 reflected from the scene 145 onto camera sensor 150.

Camera system 100 may also include image capture logic 160. In digital cameras, the image capture logic 160 reads out the charge build-up from the camera sensor 150. The image capture logic 160 generates image data signals representative of the light 130 captured during exposure to the scene 145. The image data signals may be implemented by the camera for auto-focusing, auto-exposure, pre-flash calculations, image stabilizing, and/or detecting white balance, to name only a few examples.

The camera system 100 may be provided with signal processing logic 170 operatively associated with the image capture logic 160, and optionally, with camera settings 180. The signal processing logic 170 may receive as input image data signals from the image capture logic 160. Signal processing logic 170 may be implemented to perform various calculations or processes on the image data signals, e.g., for output on the display 190.

In addition, the signal processing logic 170 may also generate output for other devices and/or logic in the camera system 100. For example, the signal processing logic 170 may generate control signals for output to exposure control module 155 to adjust exposure time of the camera sensor 150 (e.g., varying exposure time). Signal processing logic 170 may also receive information from the exposure control module 155.

In an exemplary embodiment, the signal processing logic 170 may be implemented to correct for defects in the digital image caused by anomalies in the camera sensor 150 and/or noise. The signal processing logic 170 may compare each pixel (or group of pixels) to neighboring pixels. If at least one of the neighboring pixels includes similar pixel values as the pixel being examined, it is likely that the pixel value represents part of the scene 145 being photographed and therefore the pixel does not need to be corrected. Otherwise, the pixel value may be corrected using traditional techniques (e.g., blurring).

For purpose of illustration, if the scene is a picture of the sky taken through a chain link fence, the pixel representing the chain link fence will include much darker pixel data than the pixels representing the sky. However, the darker pixel data due to the chain link fence will also appear in at least one neighboring pixel. Correcting this pixel would unnecessarily blur the image, reducing image quality. If only the one pixel (or group of pixels) includes darker pixel data while all the neighboring pixels have much lighter pixel data, it is likely that this anomaly is due to a defective pixel or noise, and does not represent part of the scene being photographed.

It is noted that some of the defective pixels and noise may change over time due to any of a wide variety of factors (e.g., test conditions, altitude, temperature, background noise, sensor damage, etc.). That is, some pixels that originally recorded "high" values may subsequently record "low" values, and vice versa. Accordingly, the sensor defects and noise may be detected "on-the-fly" for each digital image (or selected digital images, e.g., based on camera settings or user selections) and only corrected when the pixel is determined to be defective, instead of basing correction on an initial calibration of the camera sensor 150. Exemplary embodiments for camera sensor defect correction and noise reduction can be better understood with reference to the exemplary camera sensor shown in FIG. 2 and illustrations shown in FIG. 3.

Figure 2:
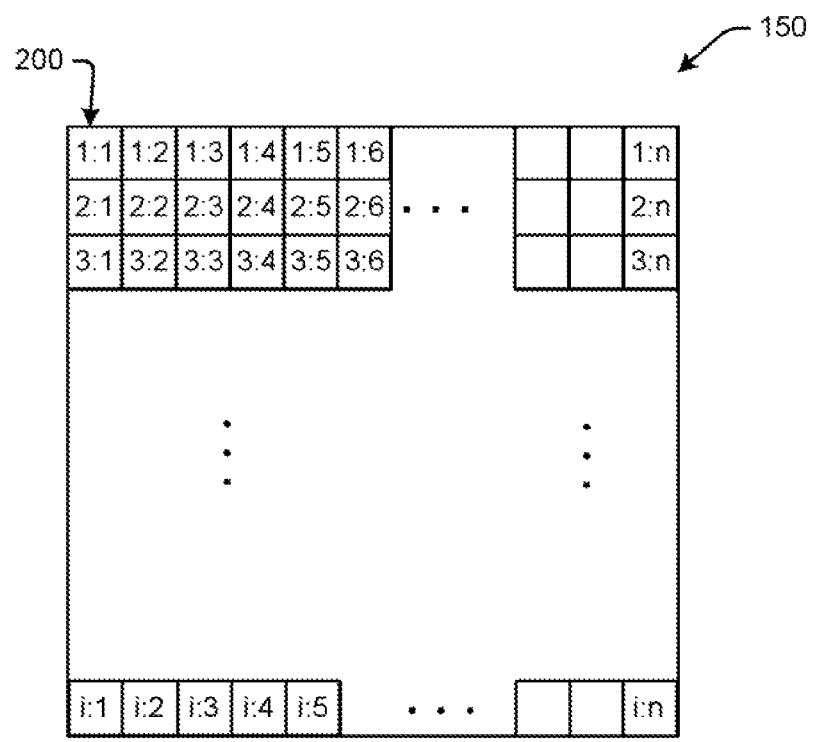
FIG. 2 is a high-level diagram of an exemplary camera sensor.

FIG. 2 is a high-level diagram of an exemplary camera sensor 150, such as the camera sensor described above for camera system 100 shown in FIG. 1. For purpose of this illustration, the camera sensor 150 is implemented as an interline CCD. However, the camera sensor 150 is not limited to interline CCDs. For example, the camera sensor 150 may be implemented as a frame transfer CCD, an interlaced CCD, CMOS sensor, or any of a wide range of other camera sensors now known or later developed.

In an interline CCD, every other column of a silicon sensor substrate is masked to form active photocells (or pixels) 200 and inactive areas adjacent each of the active photocells 200 for use a shift registers (not shown). In FIG. 2, the photocells 200 are identified according to row:column number. For example, 1:1, 1:2, 1:3, . . . 1:n correspond to columns 1-n in row 1; and 2:1, 2:1, 2:2, 2:3, . . . 1:n correspond to columns 2-n in row 2.

Although n columns and i rows of photocells, it is noted that the camera sensor 150 may include any number of photocells 200 (and corresponding shift registers). The number of photocells 200 (and shift registers) may depend on a number of considerations, such as, e.g., image size, image quality, operating speed, cost, etc.

During operation, the active photocells 200 become charged during exposure to light reflected from the scene. This charge accumulation (or "pixel date") is then transferred to the shift registers after the desired exposure time, and may be read out from the shift registers. The pixel data may be used to identify defective pixels "on-the-fly," as explained in more detail with reference to FIG. 3.

Figure 3:
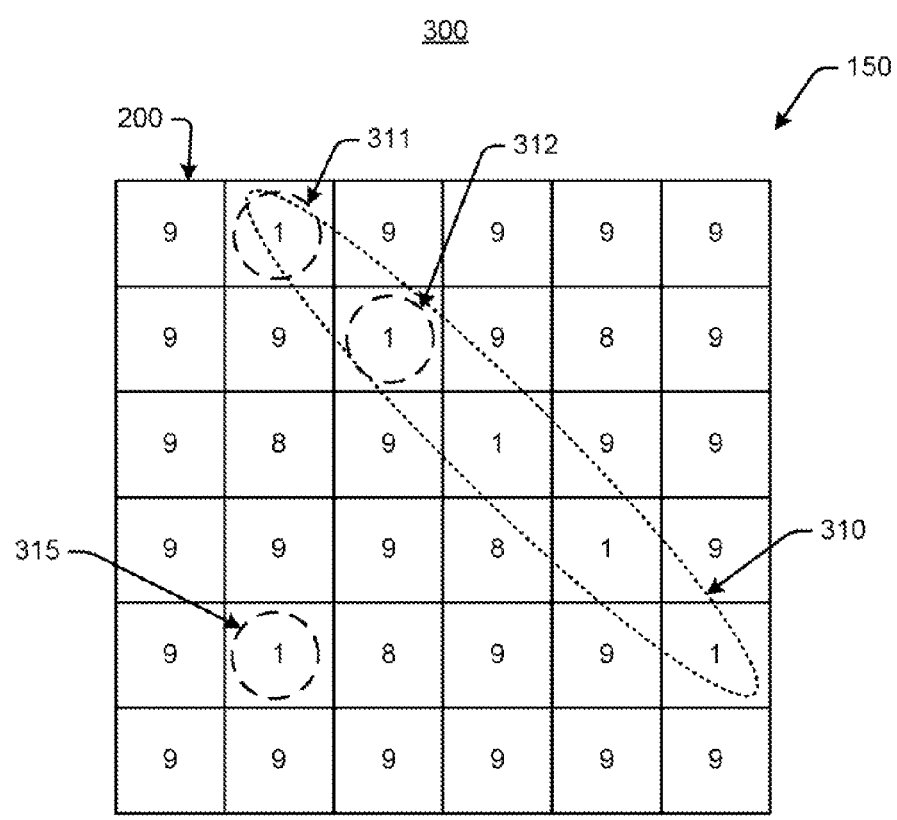
FIG. 3 is a high-level diagram of an exemplary camera sensor illustrating pixel data which may be used for cameras sensor defect correction and noise reduction.

FIG. 3 is a high-level diagram of an exemplary camera sensor 150 illustrating pixel data which may be used for camera sensor defect correction and noise reduction. For purposes of simplification, the camera sensor 150 is shown having six columns and six rows of active photocells 200. For purpose of this example, the charge accumulation or pixel data 300 and 300' is shown as numerical values ranging from the value "1" (indicating a low reflected light level or dark areas) to the value "9" (indicating a very bright reflected light), although actual pixel data may range from values of 1 to values of 1000 or more.

During operation, the camera sensor 150 is exposed to light reflected from the scene being photographed. In this example, the scene being photographed includes a very light area (e.g., mostly sky) as it may be viewed through a chain link fence. Accordingly, the pixel data 300 includes mostly "9s" (representing the sky), with a line 310 of "1s" (representing the chain link fence).

After the desired exposure time, the pixel data 300 may be transferred from the active photocells 200 to the shift registers (not shown), read out, and the pixel value for each pixel compared to pixel data for neighboring pixels. In an exemplary embodiment, the comparison may be handled by a comparison engine. The comparison engine may be implemented as logic residing in memory and executing on a processor in the camera system.

During the comparison procedure, pixel 311 is found to have a relatively high pixel value. However, the darker pixel data also occurs in at least one neighboring pixel 312, and therefore likely represents part of the scene being photographed. In this case, for example, the high pixel values in pixels 311 and 312 represent a portion of the chain link fence 310. Correcting these pixels would unnecessarily blur the image, reducing image quality.

Also during the comparison procedure, pixel 315 is the only pixel including the darker pixel value "1," while all the neighboring pixels have much lighter pixel values of "9." Therefore, it is likely that the pixel value in pixel 315 is an anomaly due to a defective pixel or noise, and does not represent part of the scene being photographed. According, pixel 315 may be properly corrected without unnecessarily degrading the image quality.

Before continuing, it is noted that the illustration described above with reference to FIG. 3 is merely exemplary and not intended to be limiting. Other features and/or modifications may also be implemented, as will be readily appreciated by those having ordinary skill in the art becoming familiar with the teachings herein.

Figure 4:
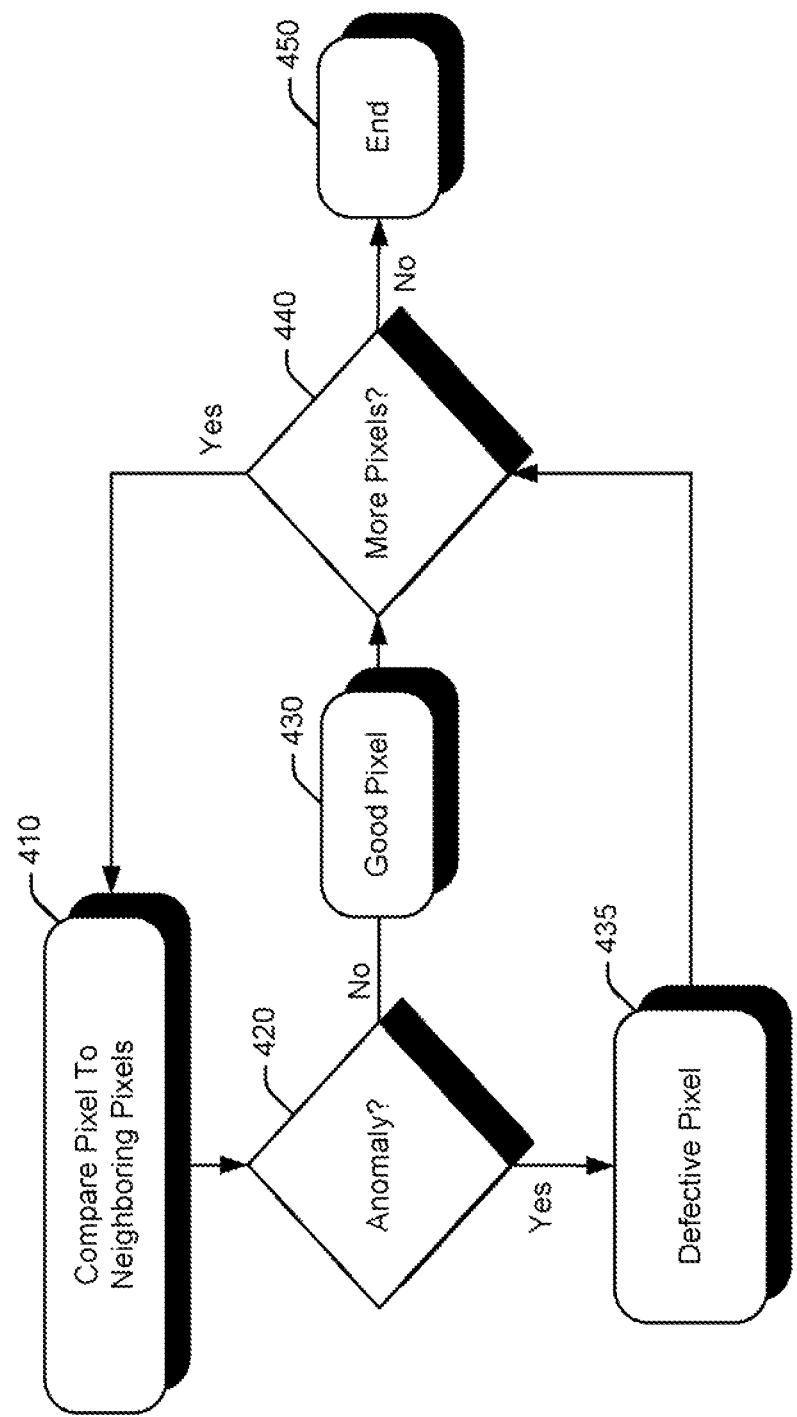
FIG. 4 is a flowchart illustrating exemplary operations which may be implemented for camera sensor defect correction and noise reduction.

FIG. 4 is a flowchart illustrating exemplary operations which may be implemented for camera sensor defect correction and noise reduction. Operations 400 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In operation 410, a pixel in a digital image is compared to neighboring pixels to identify an anomaly. Exemplary methods of comparing the sensor defects are described above, although other methods are also contemplated. In operation 420, a determination is made whether the pixel data represents an anomaly. For example, if the pixel data for the pixel being analyzed is substantially the same as pixel data for at least one neighboring pixel, it is likely that the pixel is good and the pixel value is representative of a scene being photographed. Accordingly, the pixel is identified as a good pixel in operation 430. The anomaly is ignored and the pixel data is used to generate the digital image.

If all of the neighboring pixel values are substantially different than the pixel being compared, it is likely that the pixel data represents an anomaly due to a defect pixel and/or noise. Accordingly, the pixel may be marked as defective in operation 435, and the pixel data may be corrected using traditional techniques (e.g., blurring).

In any event, another determination may be made in operation 440 whether there are more pixels to be compared. If there are additional pixels to be compared, the routine may return to operation 410 to continue comparing pixels. If, however, there are no more pixels to be compared, the routine may end in operation 450, and the image may be generated by correcting pixel data for anomalies caused by pixel defects and/or noise.

The operation shown and described herein are provided to illustrate exemplary implementations for camera sensor defect correction and noise reduction. The operations are not limited to the ordering shown. In addition, still other operations may also be implemented as will be readily apparent to those having ordinary skill in the art after becoming familiar with the teachings herein.

It is noted that the exemplary embodiments shown and described are provided for purposes of illustration and are not intended to be limiting. Still other embodiments are also contemplated for camera sensor defect correction and noise reduction.

The invention claimed is:
1. A system comprising:
 a sensor configured to output pixel values corresponding to a scene being photographed;
 signal processing logic executing to compare pixel values output by the sensor to all neighboring pixels values even across scan lines, the signal processing logic correcting pixel values only if an anomaly in the pixel values is absent from the neighboring pixels.

2. The system of claim 1, wherein the sensor is a digital camera sensor.

3. The system of claim 1, wherein the signal processing logic corrects pixel values for sensor defects.

4. The system of claim 1, wherein the signal processing logic corrects pixel values for noise.

5. The system of claim 1, the signal processing logic corrects pixel values based at least in part on all of the neighboring pixels.

6. The system of claim 1, wherein defects and noise are corrected in images generated by the sensor without calibrating the sensor.

7. The system of claim 1, wherein defects and noise are corrected on-the-fly.

8. A method for camera sensor defect correction and noise reduction, comprising:
    comparing each pixel in a digital image to all neighboring pixels in all directions to identify an anomaly;
    ignoring the anomaly if the anomaly occurs in at least one neighboring pixel; and
    marking the pixel as defective if the anomaly does not occur in any neighboring pixels.

9. The method of claim 8, wherein only the pixel marked as defective is corrected.

10. The method of claim 9, wherein correcting the pixel marked as defective is based on pixel values of at least some of the neighboring pixels.

11. The method of claim 8, wherein defects and noise in the camera are corrected without calibration.

12. The method of claim 8, wherein comparing the pixel occurs on-the-fly during camera use.

13. The method of claim 8, wherein each pixel in a camera sensor is compared.

14. The method of claim 8, wherein groups of pixels in a camera sensor are compared.

15. A system for reducing defects and noise in sensors, comprising means for identifying at least one defective pixel in a digital image based on pixel values for all neighboring pixels in two dimensions, the at least one pixel is determined to be defective or affected by noise only if the anomaly is absent from all neighboring pixels, wherein pixels are affected by noise are any good pixel value significantly different than what should be recorded to represent a scene being photographed.

16. The system of claim 15, further comprising means for correcting pixels on the fly without prior calibration.

17. The system of claim 15, further comprising means for comparing a group of pixels to all neighboring pixels of the group of pixels.

* * * * *